(12) United States Patent
Choi

(10) Patent No.: US 9,277,172 B2
(45) Date of Patent: Mar. 1, 2016

(54) APPARATUS FOR EYE CONTACT VIDEO CALL

(71) Applicant: Kwonhue Choi, Daegu (KR)

(72) Inventor: Kwonhue Choi, Daegu (KR)

(73) Assignee: INDUSTRY ACADEMIC COOPERATION FOUNDATION OF YEUNGNAM UNIVERSITY, Gyeongsangbuk-Do (KR)

( * ) Notice: Subject to any disclaimer, the term of this patent is extended or adjusted under 35 U.S.C. 154(b) by 2 days.

(21) Appl. No.: 14/300,610

(22) Filed: Jun. 10, 2014

(65) Prior Publication Data

US 2015/0049165 A1 Feb. 19, 2015

(30) Foreign Application Priority Data

Aug. 16, 2013 (KR) .......................... 10-2013-0097443

(51) Int. Cl.
*H04N 7/14* (2006.01)

(52) U.S. Cl.
CPC ...................................... *H04N 7/144* (2013.01)

(58) Field of Classification Search
CPC ......... H04N 7/15; H04N 7/142; H04N 7/147; H04N 7/144; H04N 7/157
USPC ....................... 348/14.01, 14.08, 14.15, 14.16
See application file for complete search history.

(56) References Cited

U.S. PATENT DOCUMENTS

| | | | | |
|---|---|---|---|---|
| 8,154,582 | B2 * | 4/2012 | Border et al. | 348/14.08 |
| 2009/0278913 | A1 * | 11/2009 | Rosenfeld et al. | 348/14.16 |
| 2011/0134205 | A1 * | 6/2011 | Arney et al. | 348/14.08 |
| 2012/0287223 | A1 * | 11/2012 | Zhang et al. | 348/14.08 |
| 2013/0093838 | A1 * | 4/2013 | Tan et al. | 348/14.16 |
| 2013/0182062 | A1 | 7/2013 | Son et al. | |

FOREIGN PATENT DOCUMENTS

| | | |
|---|---|---|
| JP | 2002-027419 | 1/2002 |
| JP | 2002027419 A | 1/2002 |
| KR | 201330083153 A | 7/2013 |

OTHER PUBLICATIONS

Notice of Allowance issued in corresponding Korean Patent Application No. 10-2013-0097443 dated Oct. 31, 2014.
Office Action issued by the Korean Patent Office in co-pending corresponding Korean Application No. 10-2013-0097443 dated Jun. 25, 2014.

* cited by examiner

*Primary Examiner* — Quoc D Tran
(74) *Attorney, Agent, or Firm* — Porzio, Bromberg & Newman, P.C.

(57) ABSTRACT

The present disclosure relates to an apparatus for an eye contact video call capable of a realistic call in eye contact with the other party. A transparent display is formed at a central part of the opaque display and a camera is formed at a rear side thereof, thereby allowing a realistic call in eye contact with the other party and at the same time, the readability to be improved even in cases of a usual display use (mode). Further, the manufacturing cost of a terminal may be reduced and an interference of an output video of a transparent display that exists in the camera photograph video may also be effectively eliminated.

10 Claims, 6 Drawing Sheets

APPARATUS FOR EYE CONTACT VIDEO CALL

CROSS-REFERENCE TO RELATED APPLICATION

This application claims priority under 35 U.S.C. §119 to Korean Patent Application No. 10-2013-0097443 filed on Aug. 16, 2013, the disclosure of which is hereby incorporated by reference in its entirety.

BACKGROUND

1. Technical Field

The present disclosure relates to an apparatus for an eye contact video call which includes not only private video calls but also industrial applications such as remote conference call, remote medical treatment and etc, and in particular, to an apparatus for an eye contact video call capable of realistically calling in cases of video call in eye contact with another party, by positioning a camera to an inside of a display concerning the IT apparatus (desktop PCs, notebook PCs, smartphones, tablet PCs, smart PCs, etc.) which uses the display.

2. Description of Related Art

Recent mobile terminal employs multiple cameras for use of video photograph and video call. A camera for use of video call structurally needs to be positioned outside, to avoid a display region, thus an image of the user during a video call tend to be photographed being tilted to one side.

FIGS. 1A and 1B are front views illustrating a conventional video call apparatus. FIG. 1A is a view illustrating a table PC in an example. FIG. 1B is a view illustrating an example of a PC screen.

As shown, the conventional video call apparatus is characterized in that a bezel 11 is formed at an edge of a display 10 and that a camera 22 is formed at one side of the bezel 11.

However, such conventional video call apparatus has a problem in that positions of a screen and camera are not matched during a video call thus a realistic video call is impossible since eyes of another caller are not headed to his/her eyes. Accordingly, he/she cannot have feelings of calling that he/she is calling face to face thereby an ultimate object cannot be realized.

To solve this problem, Korean patent laid-open publication no. 10-1998-077854 discloses a system for an eye contact image communication that provides a natural communication environment at a position identical to an eye level of another party, wherein there is included a shutter that controls a photograph motion of camera to be synchronized on a clock signal.

However, such conventional system for eye contact image communication has a problem in that it is difficult to be used as a usual display and the manufacturing cost increases since the entire display screen is formed of a transparent display thus causing the readability to be decreased.

Further, there is another problem in that an additional shutter needs to be employed in order to open and shut the camera.

Further, it is required for an apparatus configured to adjust a synchronous signal in regards to both terminals of the caller to be added respectively. Also, a synchronous signal should be exchanged in addition to the video data thereby causing, a system constituent to be increased and also construction and control to be complex.

Further, the apparatus consists of physically separated modules and thus, the system construction may be complex unlike the existing single-body display.

SUMMARY

An object of this disclosure is to overcome the aforesaid problems of the conventional technique, and to provide an apparatus for an eye contact video call wherein a transparent display is formed only in a central part of an opaque display.

Further, provided herein is an apparatus for an eye contact video call that photographs by means of a camera while a transparent display is turned on/off periodically.

Further, provided herein is an apparatus for an eye contact video call that reconstructs a transmission video frame by selectively removing a video frame photographed at a state in which a transparent display is turned on in a sending end (a display mode) or by selecting a photographed video frame of a state in which a transparent display is turned off (a transparent glass mode).

In order to accomplish the said object, according to one exemplary embodiment of the present disclosure, there is provided an apparatus for an eye contact video call comprising: an opaque display that displays a video; and a transparent display that is formed at a central part of the opaque display and is periodically turned on/off to display a video; a camera that is formed at a rear side of the transparent display and photographs a video of a front side by penetrating the transparent display; a video signal process unit that reconstructs an output video by controlling a video frame according to a state in which the transparent display is on/off, among a photographed video by the camera; and a communication unit that transmits and receives the output video reconstructed in the video signal process unit.

A one-way film is further formed between the transparent display and the camera so that the light passes through it in one-way direction from—the transparent display to the camera.

The camera photographs a video only at a state in which the transparent display is in an off state (a transparent glass mode).

The camera photographs a video at all times regardless of whether the transparent display is on/off.

The camera photographs a video by being turned on/off to be crossed with the on/off cycles of the transparent display.

The video signal process unit reconstructs an output video by selectively removing an interference video frame of a state in which the transparent display is on among a video photographed by the camera.

The video signal process unit reconstructs an output video by selecting only a video frame of a state in which the transparent display is off (transparent glass mode) among a video photographed by the camera.

The video signal process unit reconstructs an output video by duplicating and then inserting or interpolating the selected video frame into adjacent front, rear frames.

The camera includes a pair of left, right stereo cameras and is positioned so as to maintain a certain interval in a transverse direction at the center of the display portion, wherein two sections of the left, right cameras are constructed with the transparent display.

The transparent display is capable of turning on/off at a cycle at which left, right transparent display regions are crossed with each other, and the video signal process unit constructs a three-dimensional video by selecting only a video frame of a state in which the corresponding transparent display is off.

The camera generates a three-dimensional video in a way to photograph at a cycle at which the left, right cameras are crossed with each other, and the transparent display that corresponds to the left, right camera regions are turned off respectively only at the photographing moment of the corresponding camera.

According to the apparatus for eye contact video call of the present disclosure configured as above, unlike a conventional apparatus for an eye contact video call, the readability is increased by forming a transparent display only at a central part of an opaque display and the manufacturing cost of the display can be reduced compared to the whole body transparent display.

Also, unlike the conventional technique, a transparent display is periodically turned on/off and a camera is configured to photograph continuously. Thus, an additional shutter may not need to be employed.

Further, the camera controls on/off to be crossed with the on/off cycles of the transparent display; or selectively removes a video frame at the moment that the transparent display is on among a video photographed by the camera; or reconstructs a transmission video by selecting only a video frame photographed at the moment that the transparent display is off (transparent glass mode). Therefore, there is no need to additionally transmit and receive a synchronization signal in regards to both callers, accordingly an apparatus for detecting the synchronization signal is not necessary such that a construction and control thereof may be simple.

Furthermore, a video call system of the other party can use the conventional video call system without modification.

DETAILED DESCRIPTION

Figure 1A:
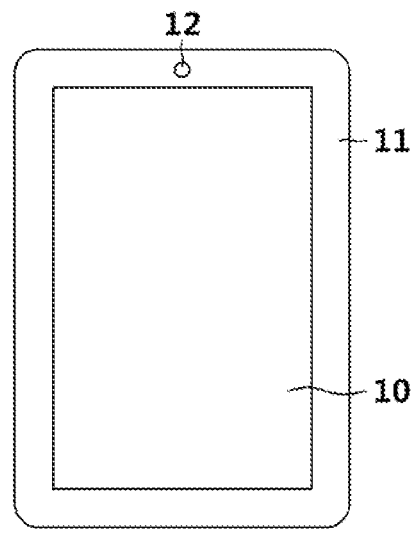
FIGS. 1A and 1B are front views illustrating a conventional apparatus for a video call.
Figure 1B:
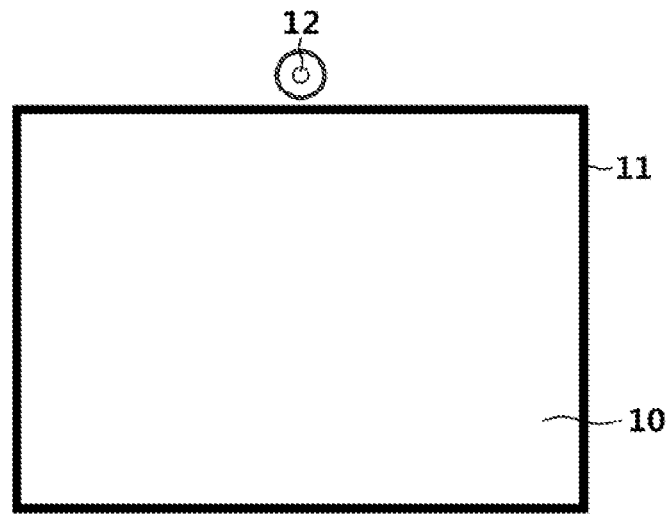

As the present disclosure allows for various changes and numerous embodiments, particular embodiments will be illustrated in the drawings and described in detail in the written description. When it is determined that detailed descriptions for well-known technologies or configurations may unnecessarily make the point of the present disclosure unclear, the detailed descriptions are not provided in explaining the present disclosure.

Reference will be now made in detail to the preferred embodiment of the present disclosure with reference to the attached drawings.

Figure 2A:
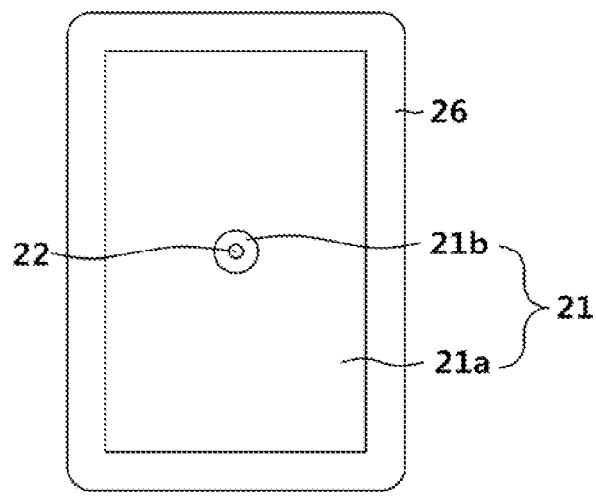
FIGS. 2A, 2B, 2C are front and side section views illustrating an apparatus for an eye contact video call according to one exemplary embodiment of the present disclosure.
Figure 2B:
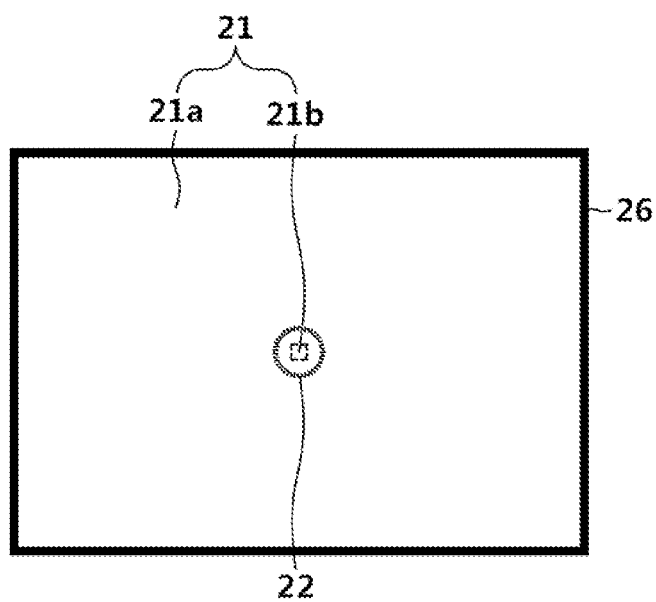
Figure 2C:
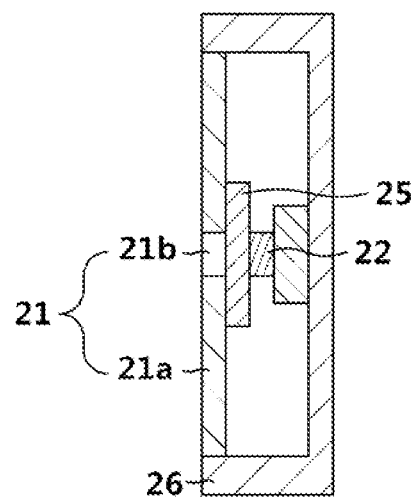

FIGS. 2A and 2B are front views illustrating an apparatus for an eye contact video call according to one exemplary embodiment of the present disclosure. FIG. 2A is a view illustrating a tablet PC in an example, FIG. 2B is a view illustrating an example of a PC screen, and FIG. 2C is a side section view of FIG. 2A. Here, the apparatus illustrated in FIGS. 2A and 2B is just an exemplary example of the present disclosure, so the present disclosure is not limited thereto and may thus include various apparatuses for video call such as usual notebooks, smartphones, and smart TVs or the like. As shown in FIGS. 2A, 2B, 2C, an apparatus for an eye contact video call in accordance with one exemplary embodiment of the present disclosure comprises: a display portion 21 comprising an opaque display 21a, a transparent display 21b, a camera 22 installed at a central rear side of the display portion 21.

The opaque display 21a is a usual display device that displays a general video like an LCD, LED, OLED. Also, it may further include a display device capable of switching transparency/opacity.

The opaque display portion 21 is such that an edge of the display screen is surrounded by a bezel 26.

The opaque display 21a is formed at an entire region of the screen and the transparent display 21b is formed at a central part of the opaque display 21a. Particularly, the transparent display 21b may be formed as minimal as the region corresponding to the later described camera lens. Also, the transparent display 21b may comprise a display device capable of switching transparency/opacity.

The camera 31 is formed at a rear side of the transparent display 30 and photographs a video of the caller (the other party or himself/herself) who is at a front side, by penetrating the transparent 21b.

Further, in the present disclosure, there may be formed a one-way film 25 between the transparent display 21b and the camera 22 so that the light passes through it in one-way direction, i.e., from the transparent display to the camera.

It is preferable that the light passes through the said one-way film 25 only from the transparent display 21b to camera 22 so that a person who sees display 21b cannot see the camera 22 and a calling person is to be photographed at a camera 22 side.

Also, in another embodiment of the present disclosure, there may be included an apparatus for a video call wherein a couple of stereo cameras that support a three-dimensional video photograph, is mounted on a central horizontal line of display in a transverse direction with a certain distance.

Figure 3:
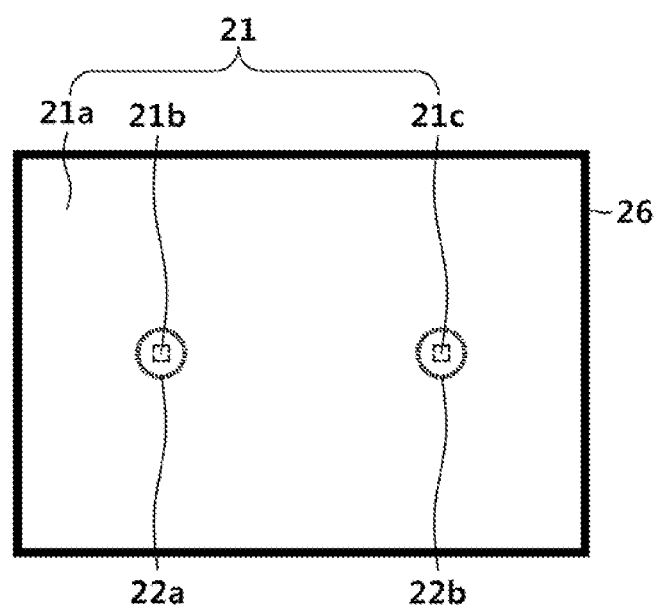
FIG. 3 is a front view illustrating an apparatus for a 3-dimensional eye contact video call according to another embodiment of the present disclosure.

As shown in FIG. 3, in the apparatus for eye contact video call according to another embodiment of the present disclosure, the said camera 22 comprises a couple of left, right stereo cameras 22a, 22b and is positioned so as to maintain a certain distance in a transverse direction at the center of the display portion 21 and two sections of the left, right cameras 22a, 22b may be constructed with the transparent displays 21b, 21c.

The said transparent displays 21b, 21c are capable of turning on/off at a cycle at which left, right transparent display regions are crossed with each other, and the video signal process unit 23 constructs a three-dimensional video by selecting only a video frame of a state in which the corresponding transparent display (21b or 21c) is off.

The said cameras 22a, 22b generate a three-dimensional video in a way to photograph at a cycle at which the left, right cameras 22a, 22b are crossed with each other, and the transparent display 21b or 21c that corresponds to the said left, right camera regions are turned off respectively only at the photographing moment of the corresponding camera 22a or 22b.

Figure 4:
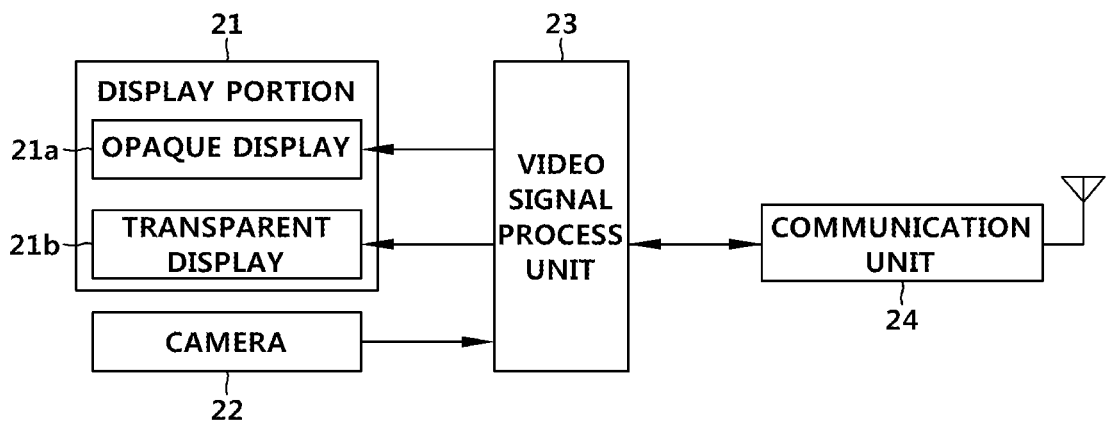
FIG. 4 is a block diagram illustrating an apparatus for an eye contact video call according to one exemplary embodiment of the present disclosure.

FIG. 4 is a block diagram illustrating an apparatus for an eye contact video call according to one exemplary embodiment of the present disclosure.

In the present disclosure, the transparent display 21b may be capable of turning on/off periodically and on/off cycle is referred to as a display cycle. Here, "on" of the transparent display 21b indicates the moment that a video is outputted to a transparent display (display mode); conversely, "off" indicates the moment that a video is not outputted to a transparent display (transparent glass mode). According to the employed screen injection method, all the pixels in the corresponding screen region may be simultaneously controlled to be on/off, or the individual injection line may be controlled to be on/off one after another. As the occasion demands, a display cycle for a video call may be designed to be longer than a display cycle for use as a usual display.

Figure 5:
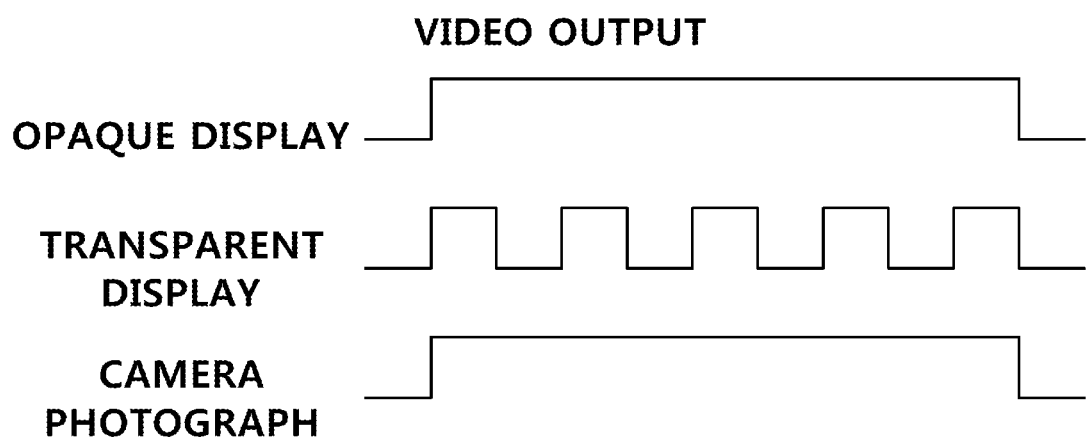
FIG. 5 is a graph illustrating the photograph cycle of transparent and opaque displays of the present disclosure.

FIG. 5 is, in the present disclosure, a graph illustrating photograph cycle of a camera and transparent and opaque displays of the present disclosure, in cases where a transparent display is controlled to be on(display mode)/off(transparent glass mode) at a speed lower than a frame rate which the display driving circuit supports.

As shown, the opaque display 21a displays a video, and a transparent display 21b is formed at a central part of the opaque display 21a and displays a video by being periodically turned on/off.

The camera 22 is formed at a rear side of the transparent display 21b and photographs a video of a front side by penetrating the transparent display 21b.

The communication unit 24 transmits and receives a transmission video processed in the said video signal process unit 23.

The video signal process unit 23 receives a video frame photographed in the said camera 22 and thereby constructs a transmission video by removing a video of a state in which the transparent display 21b is on (display mode) or by selecting a video of an off state (transparent glass mode).

The camera 22 photographs a video only at the moment that the transparent display 21b is off (transparent glass mode) or is capable of photographing a video at all times regardless of whether the transparent display 21b is on/off. Also, the transparent display 21b may not be controlled to be on/off separately but be operated just based on a basic frame rate of the entire display drive circuit. In this case, a frame cycle of camera 22 may be designed to be crossed, so that the moment that the image sensor (not shown) of camera 22 is turned on, could be synchronized as the empty time intervals between the consecutive video frames of the display.

Therefore, the communication unit 24 may transmit a video that is reconstructed by a video frame of the moment that the said transparent display 21b is turned off (transparent glass mode), which is processed in the video signal process unit 23.

In the present disclosure, the camera 22 may be a subminiature camera. In a central part of the transparent display screen 21b on which the camera 22 is positioned, a transparent display 21b is used only by the size of camera lens; rest portions use the existing opaque display 21a. For a display having no possibility of rotation, a position of camera may be adequately positioned up or down than the center, so as to be optimal for the eye level of the other part caller who is displayed in the screen.

In another embodiment, one display capable of switching opaque/transparent display mode in the entire region is used. For the case of a video call, it switches between opaque display/transparent glass modes only for a region that corresponds to a camera lens of a center while maintaining opaque mode in the other region. For the cases other than a video call, whole display region is set to opaque display mode.

Here, the present disclosure is characterized in that the opaque display 21b and the transparent display 21a are have the same basic structure, and that transparent and opaque panels (not shown) may be selectively fabricated according to whether the devices constituting the said displays (such as electrode, TFT, Substrate, light emitting display and so forth), are transparent or opaque. Hence, a so-called monolithic but locally transparent display may be manufactured, wherein a tiny portion of the display panel are made transparent. Thus in accordance with such configuration, it is possible to transparentize just as large as the lens size of the subminiature camera.

Meanwhile, according to the characteristics of the transparent display 21b, the caller may see an internal camera 22 behind the transparent display 21b, thus a mismatch between transparent/opaque regions in the calling screen may take place. To solve this, the present disclosure is characterized by inserting a one-way light transmission film 25 (e.g., an interrogation room mirror film or one-way light blocking show-window film and so forth) between the camera 22 and the transparent display 21b panel, thus making the internal camera 22 behind the transparent display 21b invisible to the caller while enabling the camera 22 to photograph the caller who is at the outer side of the transparent display 21b.

Figure 6:
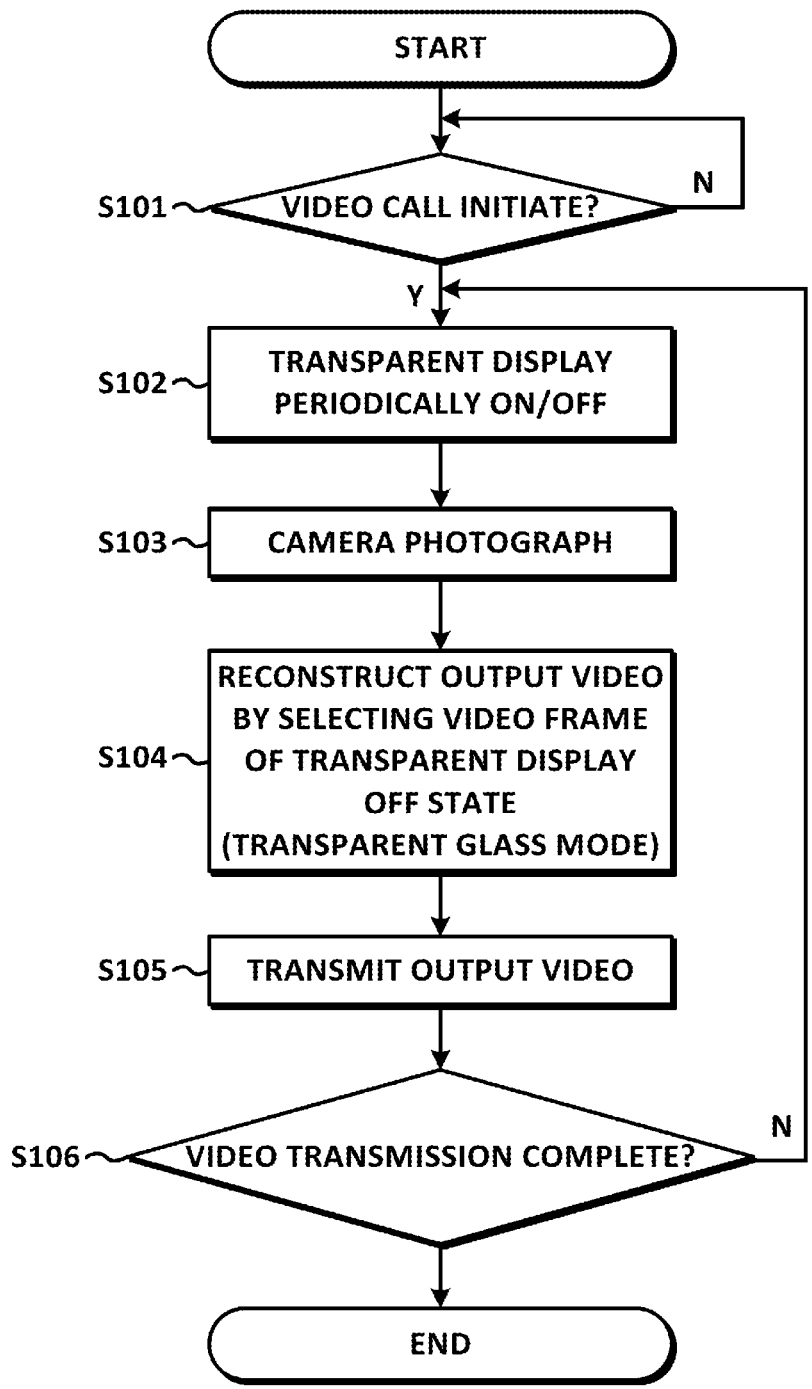
FIG. 6 is a control flow diagram for explanation of an action of FIG. 4.

FIG. 6 is a control flow diagram for explanation of an action of FIG. 4, and illustrates a control, a video photographing, and a transmission process regarding a display.

The application of the present disclosure configured as above will be in detail explained on the following.

As shown in FIG. 6, if a video call initiates at the terminal of the caller (S101), a video of the other party is outputted to a display 21 and a transparent display 21b region at the center is periodically turned on and off, the corresponding region of the other party's video is thus outputted only at the "on" moment (S102).

The camera 22 that is formed at a rear side of the transparent display 21b photographs a video of a front side by penetrating the said transparent display 21b (S103). Here, the camera 22 may photograph a video at all times regardless of whether the transparent display 21b is turned on/off.

The video signal process unit 23 constructs the transmission video by removing the video frames of 'on' states of the transparent display 21b after receiving the video frame photographed in the camera 22 or by selecting the video frames of 'off' state (S104).

Figure 7:
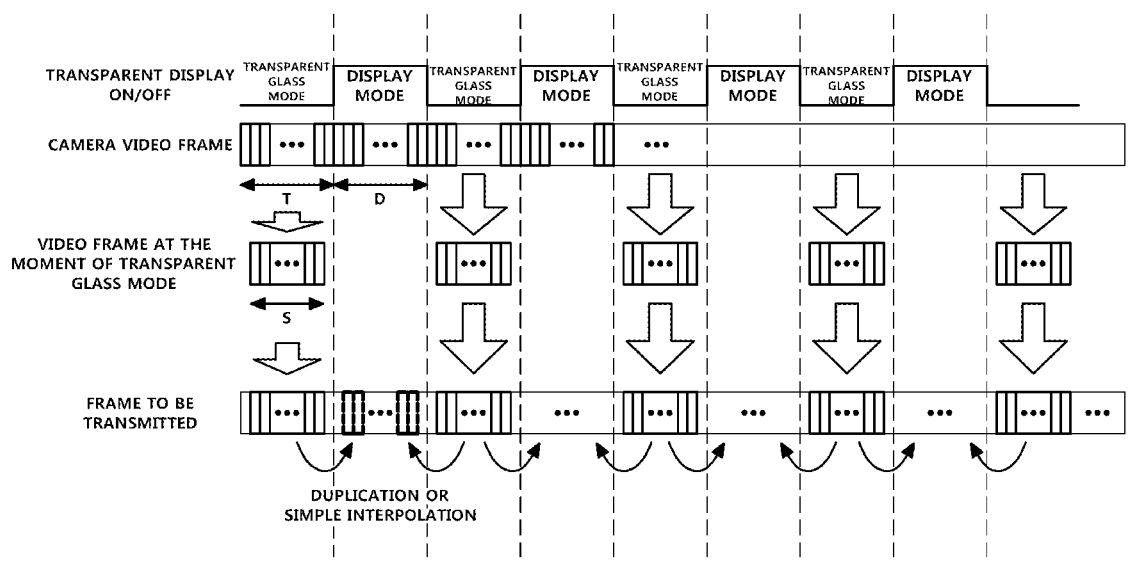
FIG. 7 is a view illustrating a process of transmission video reconstruction of video signal process unit in FIG. 6.

FIG. 7 is a process view of a video signal process unit 23 in cases of reconstructing a video to be transmitted by selecting only the video frames of the camera 22 that corresponds to the moment that the transparent display 21b is turned off (transparent glass mode).

Suppose that a frame length of a camera photograph video that corresponds to the moment that the transparent display 21b is turned off (transparent glass mode) is "T", and that a frame length of a camera photograph video that corresponds to the moment being turned on (display mode) is "D". Among "T" frames at every moment of transparent glass mode, the "S" frames are selected except for a few front/rear frames, the edge frames of the S selected frames are then repeated or are used for a simple interpolation for the non-selected frames. Thus, "T+D−S" non-selected camera video frames are replaced.

Here, a variable "T" is a natural number, "D" is an integer, and "S" is a natural number equal to or smaller than "T". "S" may be determined considering a physical time to switch on/off the transparent display 21b.

In cases where a photograph frame cycle of the camera 22 and on/off cycle of the transparent display 21b are to be crossed so as to satisfy T=1, D=1 and S=1, only one video frame per cycle needs to be reconstructed or, simply the reconstruction process may be omitted.

Thereafter, the communication unit 24 transmits a transmission video to the other party's terminal which is processed in the video signal process unit 22 and performs repeatedly the aforesaid process until the video transmission is completed (S105~S106).

Therefore, according to the present disclosure, a transparent display is formed at a central part of the opaque display and a camera is formed at a rear side thereof, thereby allowing a realistic call in eye contact with the other party and at the same time, the readability not to be destroyed even in cases of a usual screen use compared to the conventional opaque display. Further, the manufacturing cost of a terminal may be reduced and an interference of an output video in transparent display that exists in the camera photograph video may also be effectively eliminated.

It is to be understood that the detailed description disclosed herein along with the accompanying drawings is intended to describe an exemplary embodiment of the present disclosure, and does not describe every possible instance of the disclosure. Therefore, various equivalents and modifications are possible within the scope of the present disclosure at the time of filing. Although the preferred embodiments of the present disclosure have been disclosed for illustrative purposes, it is self-evident to a person skilled in the art that the disclosure is not limited to this exemplary embodiment, and that various modifications, additions and substitutions are possible without departing from the scope and spirit of the present disclosure as disclosed in the accompanying claims.

What is claimed is:

1. An apparatus for an eye contact video call comprising:
   a display portion comprising:
   an opaque display that displays a video;
   a transparent display that is formed at a central part of the opaque display and is periodically turned on/off to display a video;
   a camera that is formed at a rear side of the transparent display and photographs a video of a front side by penetrating the transparent display;
   a video signal process unit that reconstructs an output video by controlling a video frame according to a state in which the transparent display is on/off, among a photographed video by the camera; and
   a communication unit that transmits and receives the output video reconstructed in the video signal process unit,
   wherein the transparent display is capable of turning on/off at a cycle at which left, right transparent display regions are crossed with each other, and
   wherein the video signal process unit constructs a three-dimensional video by selecting only a video frame of a state in which the corresponding transparent display is off.

2. The apparatus for eye contact video call of claim 1, wherein a one-way film is further formed between the transparent display and the camera so that the light passes through it in one-way direction from the transparent display to the camera.

3. The apparatus for eye contact video call of claim 1, wherein the camera photographs a video only at a state in which the transparent display is in an off state.

4. The apparatus for eye contact video call of claim 1, wherein the camera photographs a video at all times regardless of whether the transparent display is on/off.

5. The apparatus for eye contact video call of claim 1, wherein the camera photographs a video by being turned on/off to be crossed with the on/off cycles of the transparent display.

6. The apparatus for eye contact video call of claim 1, wherein the video signal process unit reconstructs an output video by selectively removing an interference video frame of a state in which the transparent display is on among a video photographed by the camera.

7. The apparatus for eye contact video call of claim 1, wherein the video signal process unit reconstructs an output video by selecting only a video frame of a state in which the transparent display is off among a video photographed by the camera.

8. The apparatus for eye contact video call of claim 6, wherein the video signal process unit reconstructs an output video by duplicating and then inserting or interpolating the selected video frame into adjacent front, rear frames.

9. The apparatus for eye contact video call of claim 1, wherein the camera includes a pair of left, right stereo cameras and is positioned so as to maintain a certain distance in a transverse direction at the center of the display portion, wherein two sections of the left, right cameras are constructed with the transparent display.

10. An apparatus for an eye contact video call comprising:
    a display portion comprising:
    an opaque display that displays a video;
    a transparent display that is formed at a central part of the opaque display and is periodically turned on/off to display a video;
    a camera that is formed at a rear side of the transparent display and photographs a video of a front side by penetrating the transparent display;
    a video signal process unit that reconstructs an output video by controlling a video frame according to a state in which the transparent display is on/off, among a photographed video by the camera; and
    a communication unit that transmits and receives the output video reconstructed in the video signal process unit,
    wherein the camera includes a pair of left, right stereo cameras and is positioned so as to maintain a certain distance in a transverse direction at the center of the display portion, wherein two sections of the left, right cameras are constructed with the transparent display,
    wherein the camera generates a three-dimensional video in a way to photograph at a cycle at which the left, right cameras are crossed with each other, and
    wherein the transparent display that corresponds to the left, right camera regions are turned off respectively only at the photographing moment of the corresponding camera.

* * * * *